Sept. 17, 1968 A. B. MAYBURY 3,401,533
GAS LIQUEFIERS
Filed March 10, 1966
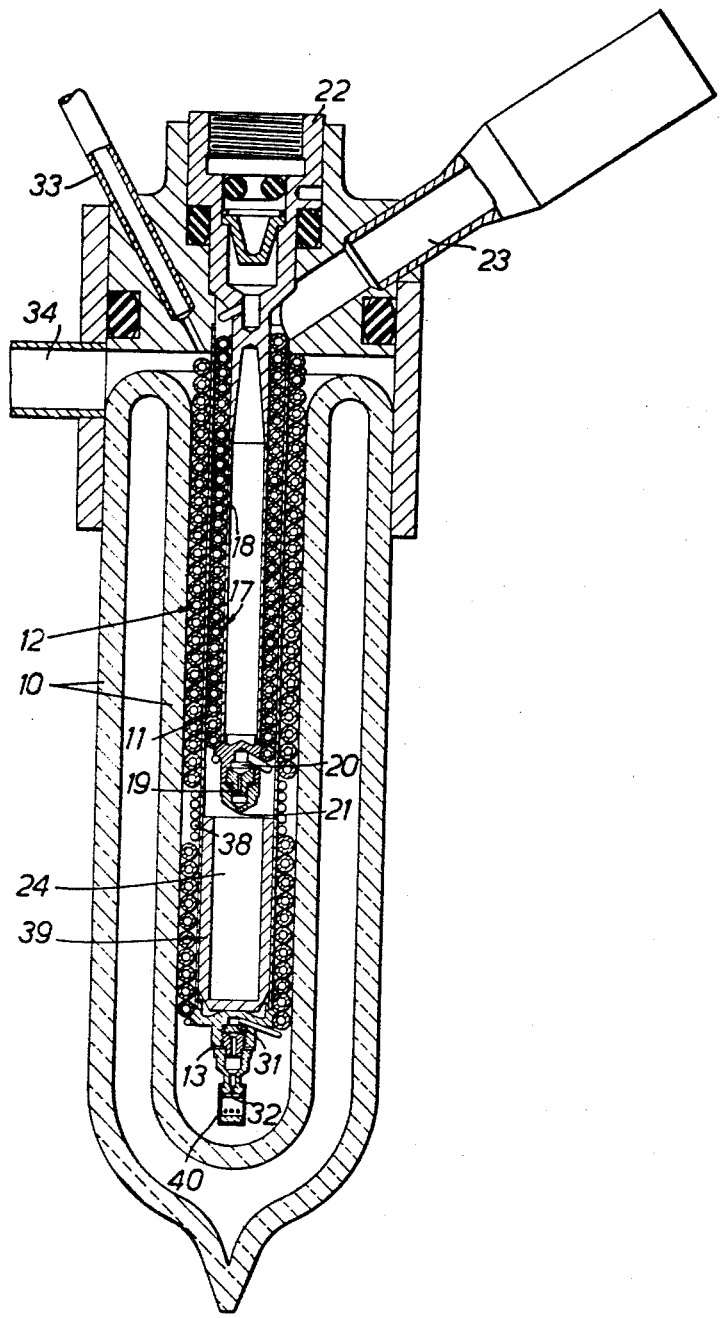
INVENTOR
ALAN B. MAYBURY
BY
Watson, Cole, Grindle + Watson
ATTORNEYS

United States Patent Office 3,401,533
Patented Sept. 17, 1968

3,401,533
GAS LIQUEFIERS
Alan Bradley Maybury, Redditch, England, assignor to The Hymatic Engineering Company Limited, a company of Great Britain
Filed Mar. 10, 1966, Ser. No. 533,271
Claims priority, application Great Britain, Apr. 1, 1965, 13,883/65
6 Claims. (Cl. 62—54)

ABSTRACT OF THE DISCLOSURE

This invention relates to a device for gas liquefication comprising two heat exchangers of generally hollow cylindrical form, the first step heat exchanger being mounted coaxially within the warm end of the second stage heat exchanger, the space within the cold end of the second stage heat exchanger being in the form of a chamber for the first stage working medium, this chamber being insulated from the second stage heat exchanger. Also the second stage heat exchanger is substantially longer than the first stage heat exchanger and extends substantially between its cold end. The two-stage gas liquefier operates under the principle of the Joule-Thompson effect.

---

This invention relates to gas liquefiers of the type in which high pressure gas is led through one path of a heat exchanger to a fixed orifice at which the gas expands to atmospheric or other pressure. The expanded gas, being colder than the incoming gas, due to isenthalpic expansion below the inversion temperature, is then passed through the other path of the heat exchanger, causing a progressive cooling of the gas until some of it becomes liquefied.

The invention is concerned with a liquefier of this type having two or more stages. Thus, for cooling a gas such as hydrogen, which has an inversion temperature of approximately 183° K., it is necessary to provide some means for precooling the hydrogen to a temperature below this point. This may conveniently be done by means of a first stage of the same type employing a gas, such as air or nitrogen, having an inversion point above atmospheric temperature.

The present invention is concerned with providing a compact and efficient arrangement having two or more stages.

According to the present invention, a gas liquefier includes a first stage in which a first stage gas having an inversion point above atmospheric temperature is passed through one path of a first stage heat exchanger, expanded and then passed back through the other path, and serves to precool a second stage gas which may have an inversion point below atmospheric temperature and which is passed through one path of a second stage heat exchanger, expanded and then passed back through the second path of the latter, the first stage heat exchanger being situated within the hot end of the second stage heat exchanger.

In one convenient form, each heat exchanger is generally of hollow cylindrical form, the first stage heat exchanger being mounted co-axially within the hot end of the second stage heat exchanger. In this case, the space within the cold end of the second stage heat exchanger may be occupied by a chamber for the first stage working medium, such chamber being insulated from the second stage heat exchanger.

The choice of insulating material employed for this purpose is of some importance since it should have a low thermal capacity and if possible its insulating properties should improve with fall of temperature.

Thus, according to one aspect of the present invention the insulating material is chosen to have both a low thermal capacity and thermal insulating properties which improve with fall of temperature.

One material that has been found to be satisfactory is polystyrene foam. Another material which has been found to be suitable is an asbestos compound sold under the trade name "Sindanyo" by the Central Manufacturing and Trading Company (Dudley) Limited. The insulating material may take the form of a deep cup fitting within the cold end of the second stage heat exchanger.

Further details and features of the invention will be appreciated from the following description of one specific embodiment, given by way of example, with reference to the accompanying drawing in which the single figure is a longitudinal section of a 2-stage gas liquefier operating by means of the Joule-Thompson effect.

In the embodiment shown, a small two stage liquefier for liquefying hydrogen is accommodated in the interior of a hollow cylindrical vacuum-walled vessel 10 of Dewar type. An intermediate tube 11 of thin material of poor heat conductivity, such as stainless steel or a plastic material, extends down into the said interior and carries on its outer surface a second stage heat exchanger 12 extending substantially its whole length to a second stage expansion head 13 at its lower end.

Inside the intermediate tube is a first stage heat exchanger 17 extending down into it for about two thirds of its depth. Each heat exchanger may be of any convenient form, normally including a helically finned tube wound helically about the axis of the device. The inner heat exchanger is mounted upon an inner tube 18, of the same material as the intermediate tube. The inner tube, at its lower end, carries a first stage expansion head 19 which may conveniently, in accordance with U.S. Patent No. 3,021,683, comprise a porous membrane 20 to freeze and remove foreign gases, and a small expansion orifice 21.

Thus, in the inner or first stage heat exchanger 17 air is admitted through a central pipe connection 22 at the top to the first path of the helical tube and from the lower end of the latter it flows into the expansion head. Here, it passes through the porous membrane 20 and then expands through the orifice 21. Since it is below the inversion temperature of air, this results in cooling. The cooled expanded air flows up through the second path of the first stage inner heat exchanger, in contact with the fins of the helical tube, and is exhausted at the top through an outlet 23, generally leading to atmosphere. Accordingly, the temperature in the region of the expansion head falls progressively until a proportion of the air is liquefied, at a temperature of 80° K., namely, well below the inversion temperature of hydrogen.

The space within the lower end of the intermediate tube 11, between the first stage expansion head 19 and the second stage expansion head 13, forms a cold chamber 24 into which the liquid air produced by the first stage expansion head collects.

Similarly, the outer or second stage heat exchanger 12 has at its lower end the expansion head 13, which again as described in the prior specification referred to above, includes a porous membrane 31 and an expansion orifice 32. Thus, hydrogen from an inlet 33 flows down through one path of the second stage or outer heat exchanger 12, and from its lower end enters the expansion head 13, and the expanded gas then flows up through the second path of the second stage outer heat exchanger and is exhausted at the upper end through a lateral pipe 34, by which it is returned to be again compressed, cooled and re-circulated.

It will be appreciated that in order to secure rapid and efficient production of liquid hydrogen, not only the hydrogen itself, but also the solid parts of the equipment, must be initially cooled to a temperature below the inversion temperature of hydrogen. For this purpose it is desirable that the cold end of the first stage liquefier should be in good thermal contact with the second stage heat exchanger. On the other hand, when the temperatures have reached an equilibrium condition, that of the first stage heat exchanger will be very much higher than that of the cold end of the second stage heat exchanger, so that any heat flowing between the two will represent an additional load on the second stage heat exchanger which is performing the ultimate purpose of liquefying the hydrogen.

Accordingly, in applying the present invention a compromise is adopted. In the first place, the fins of the second stage helical tube are removed in the region of the first stage expansion head, so as to enable a portion 38 of the helical tube to be brought into more intimate thermal contact with the first stage. Secondly, the chamber 24 in the cold end of the second stage heat exchanger, within which the liquid air collects, is lined with a deep cup 39 of a material having a low thermal capacity, and also having thermal insulating properties which improve as the temperature falls at the cold end of the second stage liquefier. The material of the cup may for example, comprise polystyrene foam or the asbestos compound sold under the trade name "Sindanyo" by the Central Manufacturing and Trading Company (Dudley) Limited.

As in the prior specification referred to above, it is preferable that the hydrogen from the second stage expansion head should not impinge directly on the bottom of the vacuum vessel, which may in fact be formed to constitute the device to be cooled, such as a photoelectric cell. Accordingly, the expansion head may be provided with a diffuser 40 from which the gas issues radially, and the space within the diffuser may be occupied by non-absorbent cotton wool.

What I claim as my invention and desire to secure by Letters Patent is:

1. A gas liquefier of generally elongated cross-section having a warm and a cold end comprising first and second heat exchangers, said second heat exchanger comprising an enclosed annular container having a fluid outlet at the warm end and a helical tubular member contained within having a fluid inlet at the warm end and expansion means at the cold end, said first heat exchanger comprising a further enclosed annular container disposed concentrically within the helical tubular member of said second heat exchanger and having an outlet at the warm end, a tubular member within said further container having an inlet at the warm end, further expansion means at the opposite end of said tubular member intermediate the ends of said further container and a cold chamber within said further container between said further expansion means and the cold end, whereby in each of said heat exchangers gas introduced at each of said inlets follows a path through said tubular member and helical tubular member respectively to said expansion means and further expansion means respectively where the gas is expanded and cooled and through said annular container and further annular container respectively to said outlets.

2. A liquefier as claimed in claim 1 wherein the walls of said chamber contained within the cold end of said further annular container include insulating material whereby said chamber is insulated from said second heat exchanger.

3. A liquefier as claimed in claim 1 in which each expansion means is of the Joule-Thompson type, wherein the first heat exchanger contains a fluid having an inversion temperature above atmospheric temperature, and a boiling point substantially higher than that of the fluid contained in the second heat exchanger.

4. A liquefier as claimed in claim 2 in which the insulation of the chamber has a low thermal capacity and thermal insulating properties which increase with fall of temperature.

5. A liquefier as claimed in claim 2 in which the insulating material comprises polystyrene foam.

6. A liquefier as claimed in claim 2 in which the insulating material comprises an asbestos compound.

References Cited

UNITED STATES PATENTS

| | | | |
|---|---|---|---|
| 2,895,303 | 7/1959 | Streeter | 62—514 |
| 3,049,620 | 8/1962 | George et al. | 62—514 |
| 3,256,712 | 6/1966 | Makowski | 62—514 |

ROBERT A. O'LEARY, *Primary Examiner.*